United States Patent
Hattori et al.

(10) Patent No.: US 10,303,960 B2
(45) Date of Patent: *May 28, 2019

(54) IMAGE PROCESSING DEVICE, ALARMING APPARATUS, IMAGE PROCESSING SYSTEM, AND IMAGE PROCESSING METHOD

(71) Applicant: HITACHI, LTD., Tokyo (JP)

(72) Inventors: Hideharu Hattori, Tokyo (JP); Yoshifumi Izumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 15/409,325

(22) Filed: Jan. 18, 2017

(65) Prior Publication Data
US 2017/0236015 A1 Aug. 17, 2017

(30) Foreign Application Priority Data

Feb. 16, 2016 (JP) ................................ 2016-026926

(51) Int. Cl.
*B60Q 5/00* (2006.01)
*B60R 1/00* (2006.01)
(Continued)

(52) U.S. Cl.
CPC ............ *G06K 9/00818* (2013.01); *B60R 1/00* (2013.01); *G06T 7/11* (2017.01); *G06T 7/70* (2017.01);
(Continued)

(58) Field of Classification Search
CPC ......... G06K 9/00818; G06T 7/90; G06T 7/70; G06T 7/11; G06T 2207/10024;
(Continued)

(56) References Cited

U.S. PATENT DOCUMENTS 6,266,442 B1 * 7/2001 Laumeyer .......... G06K 9/00818
382/104
6,801,638 B1 10/2004 Janssen et al.
(Continued)

FOREIGN PATENT DOCUMENTS

EP 1 930 863 A2 6/2008
JP 2004-272694 A 9/2004
(Continued)

OTHER PUBLICATIONS

Malik et al., "Road sign detection and recognition using colour segmentation, shape analysis and template matching." Machine Learning and Cybernetics, 2007 International Conference on. vol. 6. IEEE, 2007.*
(Continued)

*Primary Examiner* — Vincent Rudolph
*Assistant Examiner* — Pinalben Patel
(74) *Attorney, Agent, or Firm* — Volpe and Koenig, P.C.

(57) ABSTRACT

An image processing device includes a contrasting correction unit, a color analysis unit, an object detection unit, and an object relation analysis unit. The contrasting correction unit creates a contrasting corrected image by correcting contrasting of an input image captured by a vehicle camera. The color analysis unit creates a color corrected image by correcting colors of the input image. The object detection unit detects a main sign included in the input image based on the contrasting corrected image and detects an auxiliary sign included in the input image based on the color corrected image. The object relation analysis unit recognizes a traffic sign as a combination of a main sign and auxiliary sign by associating the main sign and the auxiliary sign with each other based on a positional relationship between the main and auxiliary signs, which are detected by the object detection unit, in the input image.

4 Claims, 10 Drawing Sheets

(51) Int. Cl.
*G06K 9/00* (2006.01)
*G06T 7/11* (2017.01)
*G06T 7/70* (2017.01)
*G06T 7/90* (2017.01)
*H04N 1/60* (2006.01)

(52) U.S. Cl.
CPC ............ *G06T 7/90* (2017.01); *H04N 1/6027* (2013.01); *B60Q 5/005* (2013.01); *B60R 2300/30* (2013.01); *G06T 2207/10024* (2013.01); *G06T 2207/30252* (2013.01)

(58) Field of Classification Search
CPC ........ G06T 2207/30252; H04N 1/6027; B60R 1/00; B60R 2300/30; B60Q 5/005
See application file for complete search history.

(56) References Cited

U.S. PATENT DOCUMENTS

| | | | | |
|---|---|---|---|---|
| 9,269,001 | B2* | 2/2016 | R ...................... | G06K 9/00818 |
| 9,767,371 | B2* | 9/2017 | Ai ..................... | G06K 9/00818 |
| 9,792,511 | B2* | 10/2017 | Behrens ................ | G06K 9/48 |
| 2005/0232469 | A1* | 10/2005 | Schofield ........... | G06K 9/00818 382/104 |
| 2005/0275732 | A1* | 12/2005 | Takeuchi ........... | H04N 1/00167 348/231.99 |
| 2008/0137908 | A1* | 6/2008 | Stein ................. | G06K 9/00818 382/103 |
| 2010/0302361 | A1* | 12/2010 | Yoneyama ......... | G06K 9/00818 348/135 |
| 2013/0201334 | A1* | 8/2013 | C ....................... | G06K 9/00818 348/148 |
| 2014/0119605 | A1* | 5/2014 | Zobel ................ | G06K 9/00818 382/103 |
| 2016/0026882 | A1* | 1/2016 | Behrens ............. | G06K 9/00818 382/104 |
| 2016/0117562 | A1* | 4/2016 | Chung ............... | G06K 9/00818 382/104 |
| 2016/0224851 | A1* | 8/2016 | Yesugade ................. | G06K 9/18 |
| 2016/0267335 | A1* | 9/2016 | Hampiholi ............ | G06F 3/013 |
| 2016/0300360 | A1* | 10/2016 | Ariga ........................ | G06T 7/11 |
| 2016/0321511 | A1* | 11/2016 | Abhau ................. | G06K 9/00818 |
| 2017/0061593 | A1* | 3/2017 | Alahmar .................. | G06T 7/70 |
| 2018/0189601 | A1* | 7/2018 | Dabeer ................ | G06K 9/6219 |

FOREIGN PATENT DOCUMENTS

| | | |
|---|---|---|
| JP | 2006-301803 A | 11/2006 |
| JP | 2008-139320 A | 6/2008 |
| JP | 2008-176357 A | 7/2008 |
| JP | 2010-026591 A | 2/2010 |

OTHER PUBLICATIONS

The Extended European Search Report dated Jul. 5, 2017 for the EP Application No. 17151954.9.
Japanese Office Action issued on Nov. 20, 2018 for the Japanese Patent Application No. 2016-026926.

* cited by examiner

[Fig. 1]
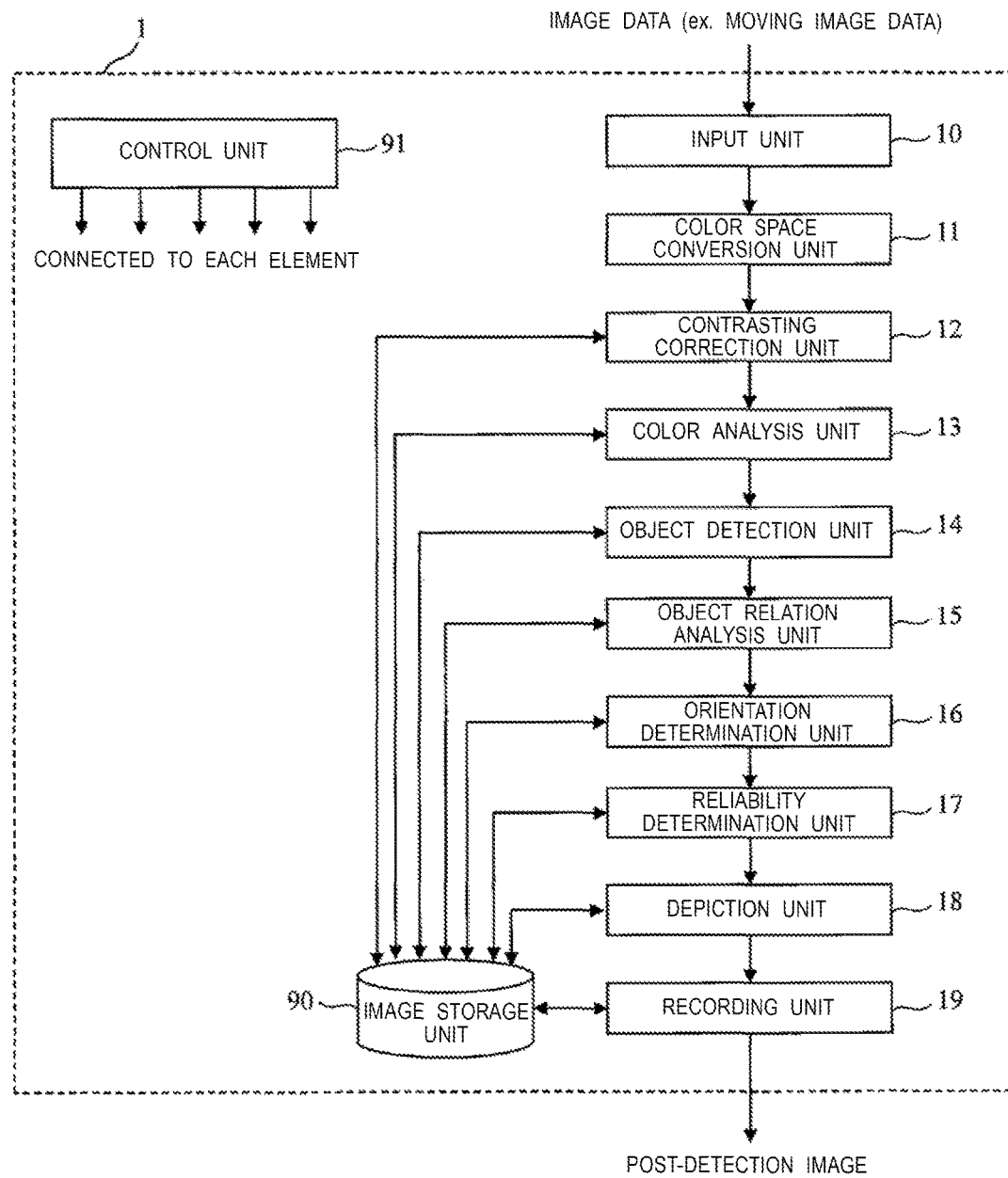

[Fig. 2]
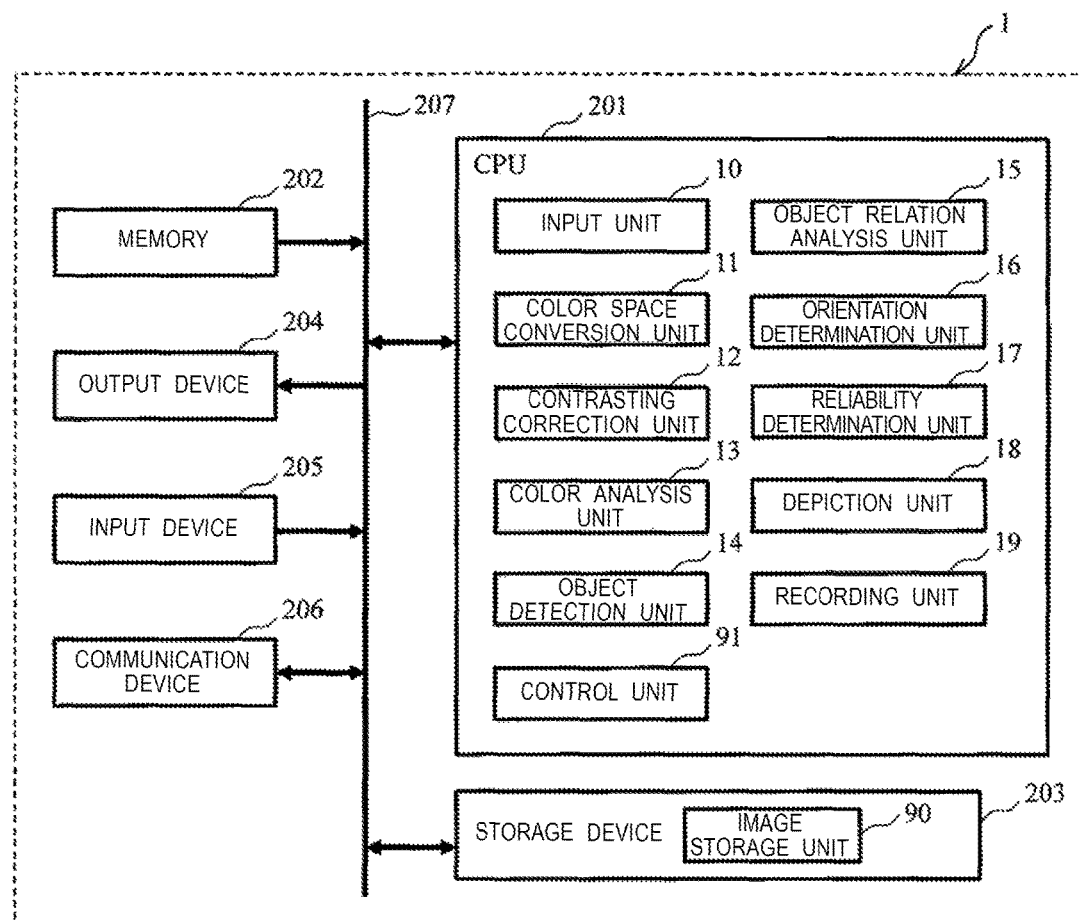

[Fig. 3]
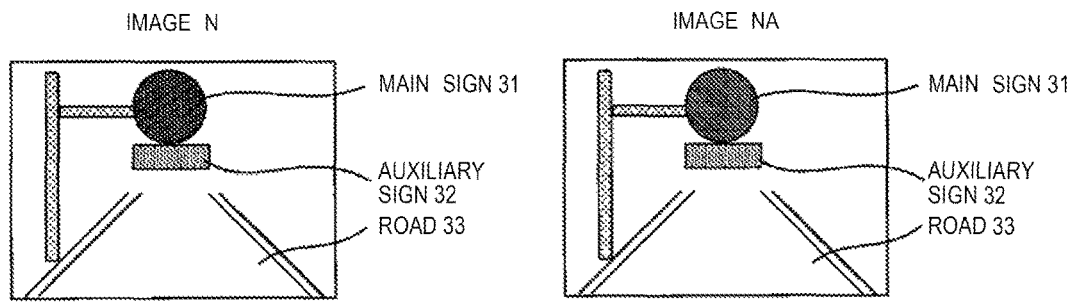
[Fig. 4]
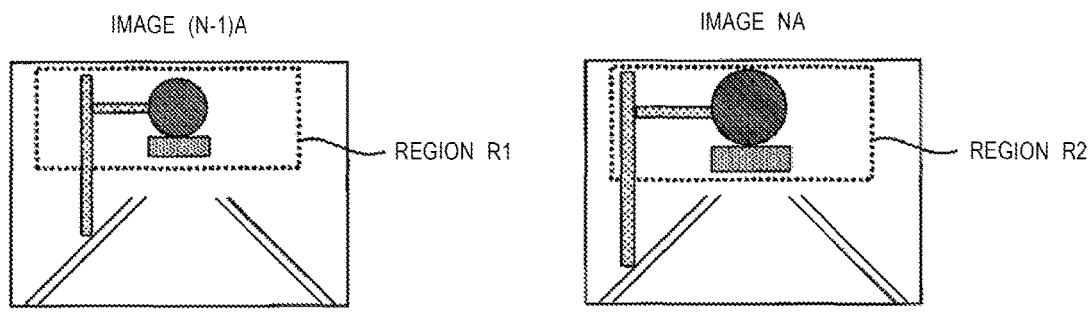
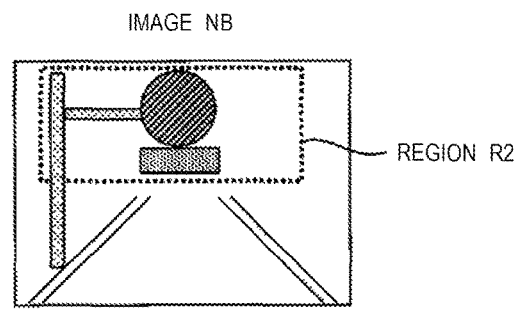

[Fig. 5]
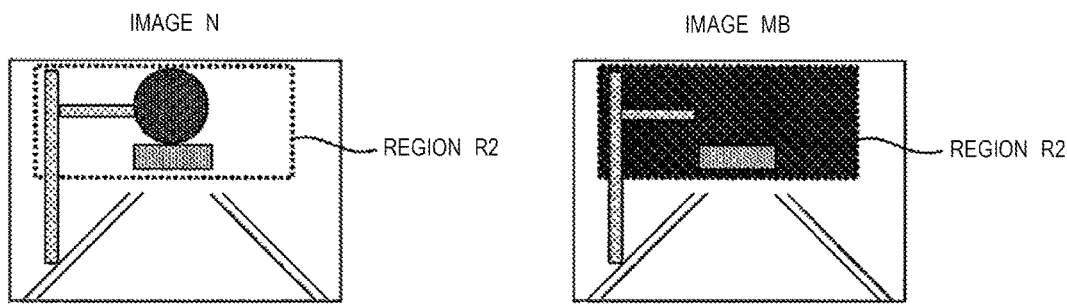
[Fig. 6]
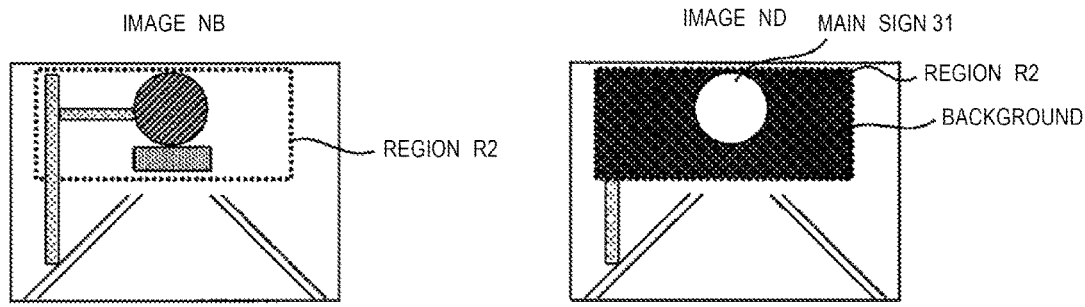
[Fig. 7]
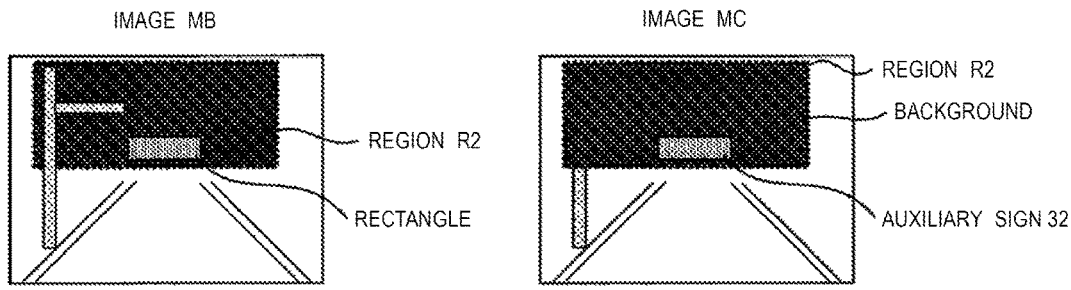

[Fig. 8]
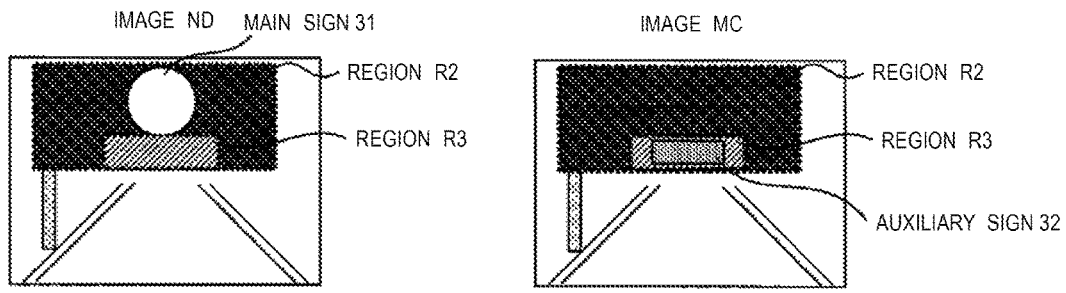
[Fig. 9]
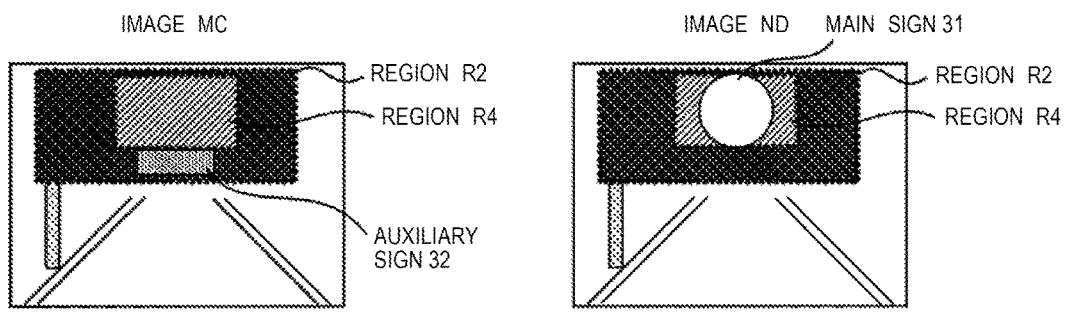
[Fig. 10]
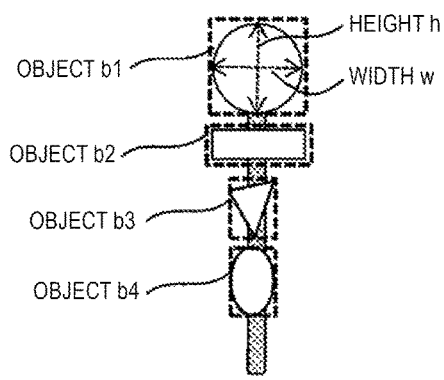

[Fig. 11]
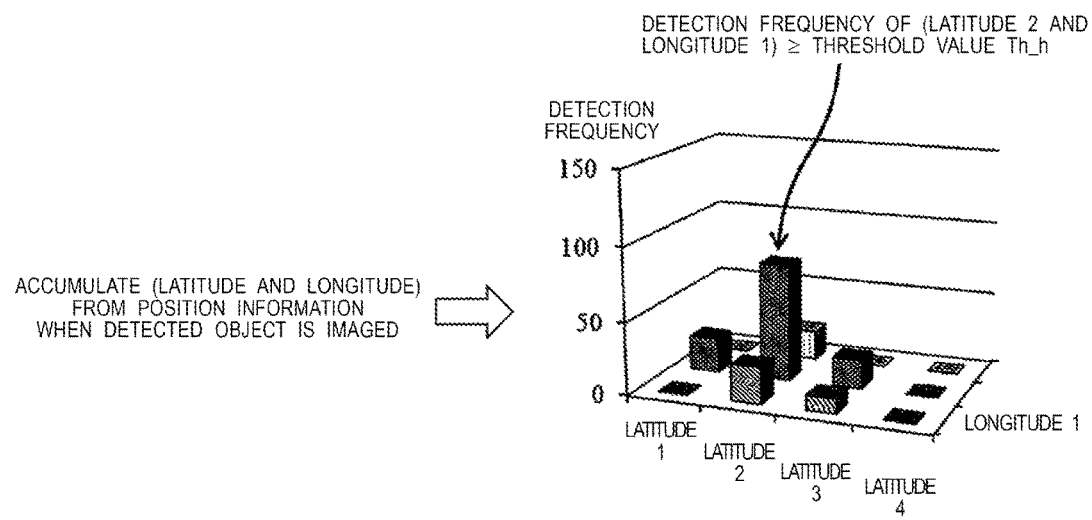
[Fig. 12]
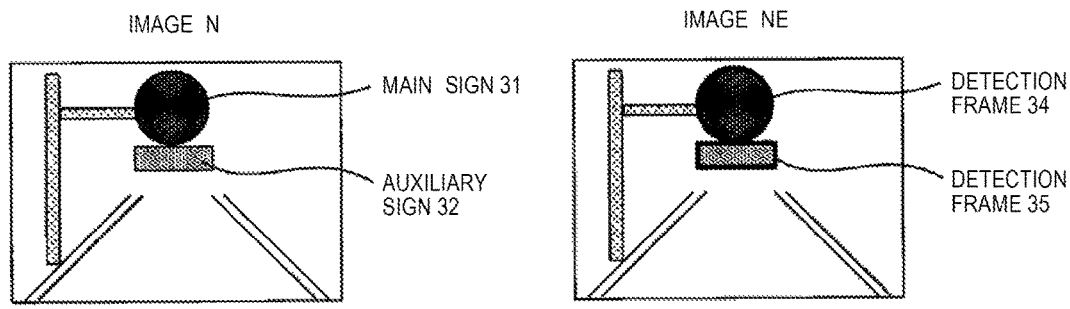

[Fig. 13]
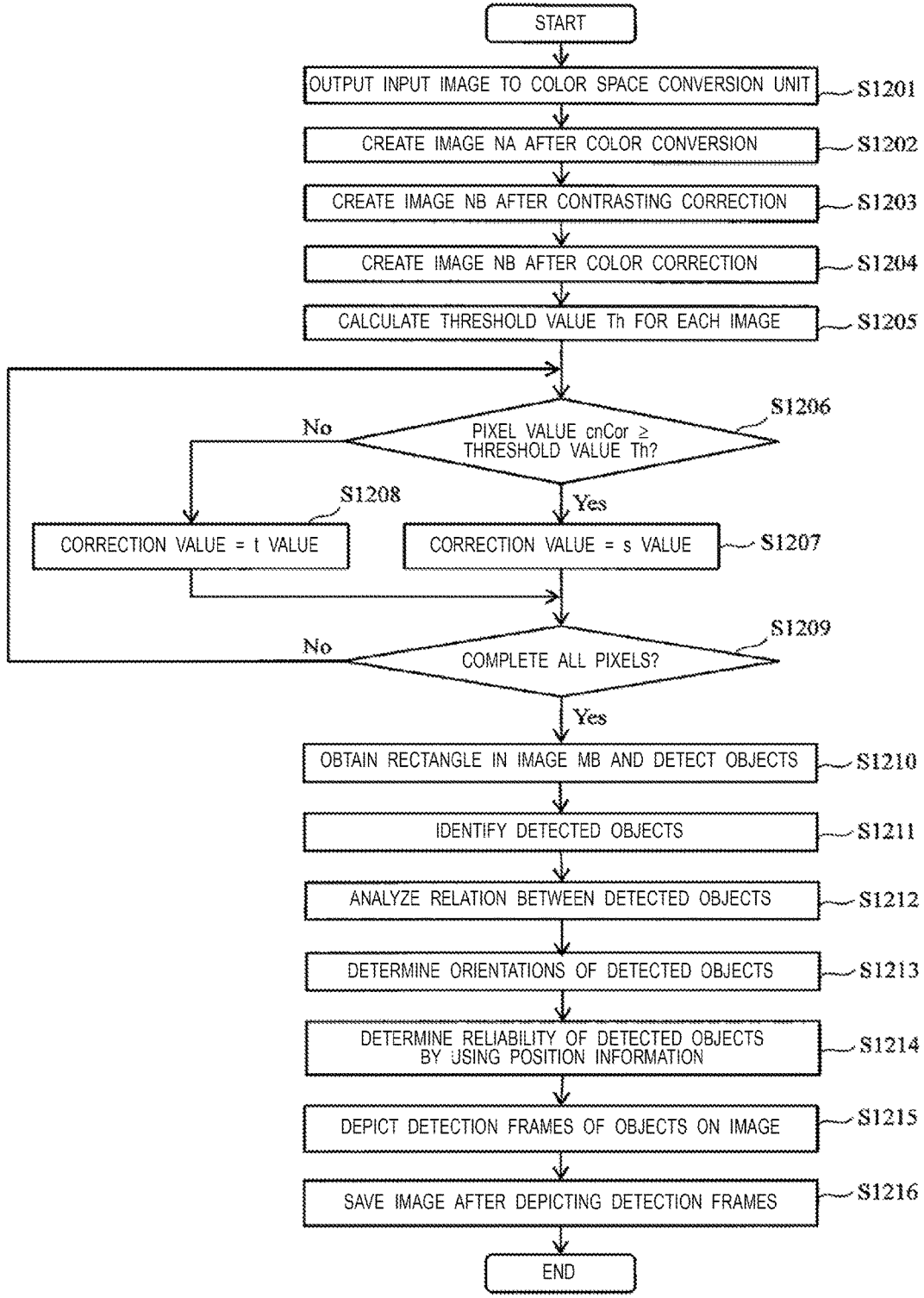

[Fig. 14]
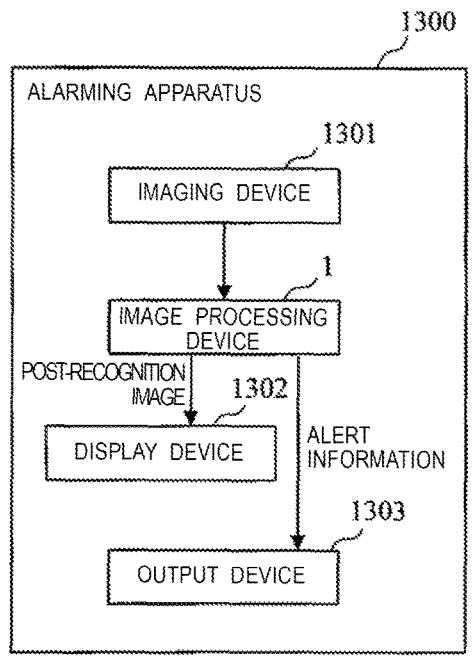
[Fig. 15]
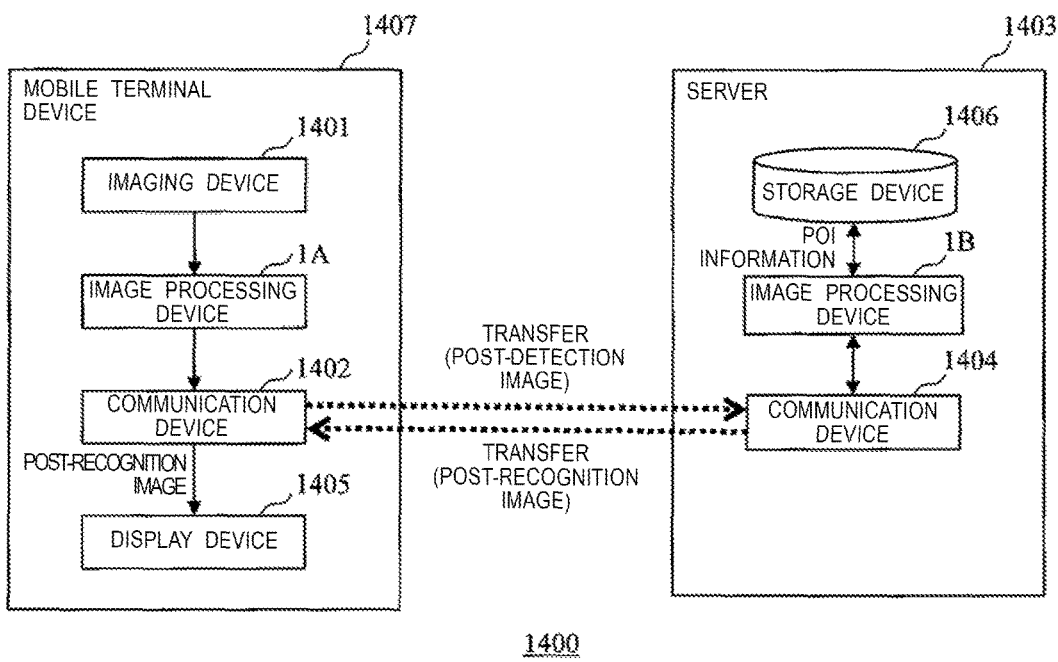

[Fig. 16]
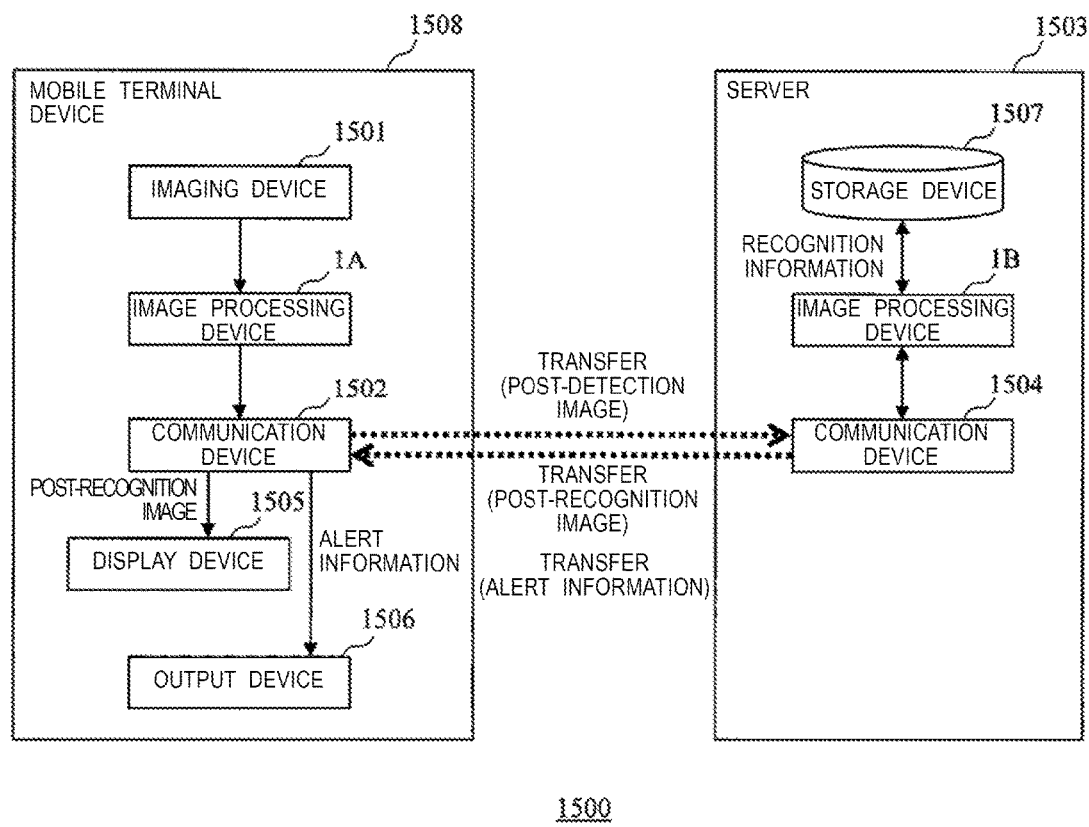

[Fig. 17]
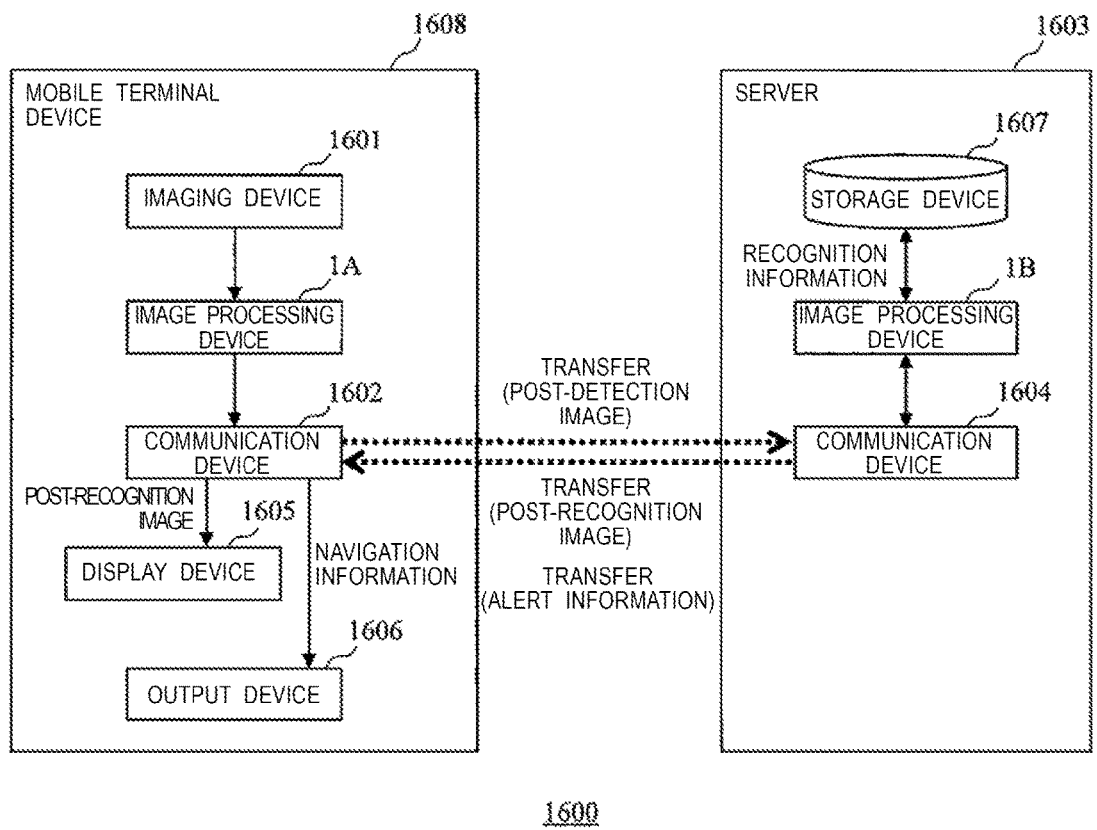

IMAGE PROCESSING DEVICE, ALARMING APPARATUS, IMAGE PROCESSING SYSTEM, AND IMAGE PROCESSING METHOD

INCORPORATION BY REFERENCE

The disclosure of the following priority application is herein incorporated by reference: Japanese Patent Application No. 2016-26926 filed Feb. 16, 2016.

BACKGROUND OF THE INVENTION

1. Field of the Invention

The present invention relates to an image processing device, an alarming apparatus, an image processing system, and an image processing method.

2. Description of Related Art

In recent years, detection of attached objects on a road in an image by using a moving image captured by an imaging apparatus such as a smartphone or a drive recorder has been proposed. For example, PTL 1 (Japanese Laid Open Patent Publication JP-A-2008-139320) discloses a technology of recognizing traffic signs from an image captured by a camera installed in a vehicle and providing information of a result of the recognition to a driver.

Some traffic signs are combinations of main signs for indicating various regulations, instructions, alarms, guidance, and the like to be provided to the driver and auxiliary signs for supplementing meaning and content of the main signs. In a case where a plurality of such traffic signs as combinations of main signs and auxiliary signs are present in a captured image, it is necessary to accurately determine which of the auxiliary signs corresponds to which of the main signs for each traffic sign and to recognize each traffic sign. However, the technology described in PTL 1 does not particularly take this point into consideration. Therefore, it is not possible to determine accurate combinations between main signs and auxiliary signs and to accurately recognize the traffic signs in some cases depending on positions and orientations of the traffic signs.

SUMMARY OF THE INVENTION

An image processing device according to the invention includes: a contrasting correction unit that creates a contrasting corrected image by correcting contrasting of an input image captured by a vehicle camera installed on a vehicle; a color analysis unit that creates a color corrected image by correcting colors of the input image; an object detection unit that detects a main sign included in the input image based on the contrasting corrected image and detects an auxiliary sign included in the input image based on the color corrected image; and an object relation analysis unit that recognizes a traffic sign as a combination of the main sign and the auxiliary sign by associating the main sign and the auxiliary sign with each other based on a positional relationship between the main sign and the auxiliary sign, which have been detected by the object detection unit, in the input image.

An alarming apparatus according to the invention includes: the image processing device; and an alarm output unit that outputs an alarm to a driver of the vehicle based on a result of recognizing the traffic sign by the image processing device.

An image processing system according to the invention includes: a terminal device that is installed on a vehicle; and a server device that performs communication with the terminal device, in which the terminal device includes a contrasting correction unit that creates a contrasting corrected image by correcting contrasting an input image captured by a vehicle camera installed on a vehicle, a color analysis unit that creates a color corrected image by correcting colors in the input image, an object detection unit that detects a main sign included in the input image based on the contrasting corrected image and detects an auxiliary sign included in the input image based on the color corrected image, and an image transmission unit that transmits a post-detection image indicating a result of detecting the main sign and the auxiliary sign by the object detection unit to the server device, and in which the server device includes an image receiving unit that receives the post-detection image transmitted from the terminal device, a second contrasting correction unit that creates a contrasting corrected image by correcting contrasting of the post-detection image received by the image receiving unit, a second color analysis unit that creates a color corrected image by correcting colors of the post-detection image received by the image receiving unit, a second object detection unit that detects a main sign included in the post-detection image based on the contrasting corrected image and detects an auxiliary sign included in the post-detection image based on the color corrected image, and an object relation analysis unit that recognizes a traffic sign as a combination of the main sign and the auxiliary sign by associating the main sign and the auxiliary sign with each other based on a positional relationship between the main sign and the auxiliary sign in the post-detection image received by the image receiving unit.

An image processing method for processing an input image captured by a vehicle camera installed on a vehicle and input to a computer according to the invention includes causing the computer to: create a contrasting corrected image by correcting contrasting of the input image; create a color corrected image by correcting colors of the input image; detect a main sign included in the input image based on the contrasting corrected image; detect an auxiliary sign included in the input image based on the color corrected image; and recognize a traffic sign as a combination of the main sign and the auxiliary sign by associating the main sign and the auxiliary sign with each other based on a positional relationship between the detected main sign and the auxiliary sign in the input image.

According to the invention, it is possible to accurately recognize traffic signs as combinations of main signs and auxiliary signs.

BRIEF DESCRIPTION OF THE DRAWINGS

FIG. 1 is a block diagram illustrating a functional configuration of an image processing device according to a first embodiment of the invention.

FIG. 2 is a diagram illustrating a hardware configuration example of the image processing device according to the first embodiment of the invention.

FIG. 3 is an explanatory diagram of an example of operations of a color space conversion unit.

FIG. 4 is an explanatory diagram of an example of operations of a contrasting correction unit.

FIG. 5 is an explanatory diagram of an example of operations of a color analysis unit.

FIG. 6 is an explanatory diagram of an example of operations of an object detection unit.

FIG. 7 is an explanatory diagram of an example of operations of the object detection unit.

FIG. 8 is an explanatory diagram of an example of operations of an object relation analysis unit.

FIG. 9 is an explanatory diagram of an example of operations of the object relation analysis unit.

FIG. 10 is an explanatory diagram of an example of operations of an orientation determination unit.

FIG. 11 is an explanatory diagram of an example of operations of a reliability determination unit.

FIG. 12 is an explanatory diagram of an example of operations of a depiction unit.

FIG. 13 is an explanatory flowchart of operations of the image processing device according to the first embodiment of the invention.

FIG. 14 is a block diagram illustrating a configuration of an alarming apparatus according to a second embodiment of the invention.

FIG. 15 is a block diagram illustrating a configuration of an image processing system according to a third embodiment of the invention.

FIG. 16 is a block diagram illustrating a configuration of an image processing system according to a fourth embodiment of the invention.

FIG. 17 is a block diagram illustrating a configuration of an image processing system according to a fifth embodiment of the invention.

DESCRIPTION OF PREFERRED EMBODIMENT

First, an outline of the invention will be described below.

Typically, it is necessary to inspect what kinds of road attached objects are present in advance for all routes through which vehicles may travel in order to provide information related to attached objects, such as traffic signs, on roads as additional information for map information, which requires expensive inspection costs. There is also a problem that additional information related to road attached objects on newly constructed roads and road changed due to construction cannot be timely reflected to the map information. Thus, embodiments of the invention described below use a vehicle terminal such as a smartphone, a drive recorder, or a car navigation device to enable road attached objects to be timely detected from images captured by a plurality and a large indefinite number of users.

Incidentally, there is a case where a plurality of traffic signs as combinations of main signs and auxiliary signs in an image captured by a vehicle terminal. If accurate combinations of the main signs and the auxiliary signs cannot be obtained in such a case, it is not possible to provide accurate sign information to users. There is also a case where a sign in a traveling direction and a sign in a direction other than the traveling direction are attached to the same sign pole. In these cases, it is not possible to provide accurate sign information to the user if the sign in the traveling direction and the sign in the direction other than the traveling direction cannot be accurately distinguished. In particular, the aforementioned technology disclosed in PTL 1 has a problem that it is not possible to obtain accurate combinations of main signs and auxiliary signs when a plurality of main signs and auxiliary signs are detected, to distinguish signs in vehicle traveling direction from signs in directions other than the vehicle traveling direction, and thereby to provide accurate sign information to the users. Thus, the embodiments of the invention described below will propose a technology for enabling desired targets to be detected in an image captured by a vehicle terminal and enabling determination of a combination between the targets and specification of orientations of the targets.

Also, the embodiments of the invention provide an image processing device and a method thereof that realize detection of objects in a background, determination of combinations between targets, and specification of orientations of the objects by separating the background and the targets in the background in an image even in a case where brightness of the captured image varies.

Hereinafter, description will be given of the embodiments of the invention with reference to drawings.

First Embodiment

<Functional Configuration of Image Processing Device>

FIG. 1 is a block diagram illustrating a functional configuration of an image processing device 1 according to a first embodiment of the invention. As illustrated in FIG. 1, the image processing device 1 includes an input unit 10, a color space conversion unit 11, a contrasting correction unit 12, a color analysis unit 13, an object detection unit 14, an object relation analysis unit 15, an orientation determination unit 16, a reliability determination unit 17, a depiction unit 18, a recording unit 19, an image storage unit 90, and a control unit 91 for functions thereof. The respective functions of the image processing device 1 as illustrated in FIG. 1 are realized by combinations of various programs and hardware in a mobile terminal device such as a smartphone or an information device such as a personal computer or a server device.

The input unit 10 obtains, from the outside, input images as targets of processing by the image processing device 1. Date of images captured by a vehicle camera installed on a vehicle, which is not illustrated in the drawing, is input to the input unit 10 as the input images at a predetermined time interval. A drive recorder installed on the vehicle, a camera included in a mobile terminal device such as a smart phone, or the like may be used as the vehicle camera. Alternatively, images captured by the vehicle camera, which are obtained via an information communication network or a recording medium that is not illustrated in the drawing, may be used as the input image. The input images may be stationary images, or the input images may be obtained by extracting arbitrary frames from a moving image. As a data format of the stationary images, JPEG, JPEG2000, PNG, or BMP, for example, is used. In contrast, MotionJPEG, MPEG, H.264, or HD/SDI, for example, is used as a data format of the moving image.

The color space conversion unit 11 obtains color brightness information of the input images by converting color spaces of the input images.

The contrasting correction unit 12 obtains the amount of variations in the color brightness in a current input image by using color brightness information of a past input image stored in the image storage unit 90 and color brightness information in the current input image obtained by the color space conversion unit 11, and creates an image by correcting the contrasting of the input image based on the amount of variations in the brightness. Hereinafter, the image created by the contrasting correction unit 12 will be referred to as a contrasting corrected image.

The color analysis unit 13 analyzes a relationship between colors of the respective pixels in an input image by using a difference value of primary colors and threshold values for color analysis, thereby creating an image by correcting the colors of the input image. Hereinafter, the image created by the color analysis unit 13 will be referred to as a color corrected image.

The object detection unit 14 detects, as detection target objects, main signs and auxiliary signs of traffic signs included in the input image by using the contrasting corrected image created by the contrasting correction unit 12 and the color corrected image created by the color analysis unit 13. Specifically, the object detection unit 14 obtains threshold values for separating the main signs from the contrasting corrected image, and separates the background and the main signs in the contrasting corrected image by using the threshold values. Also, the object detection unit 14 separates the background and the auxiliary signs in the color corrected image by detecting rectangular objects corresponding to the auxiliary signs in the color corrected image. The main signs and the auxiliary signs are detected by extracting the main signs and the auxiliary signs from the contrasting corrected image and the color corrected image, respectively, and comparing the main signs and the auxiliary signs with preset reference images in this manner.

The object relation analysis unit 15 analyzes relations between objects based on positional relationship between the main signs and the auxiliary signs, which have been detected by the object detection unit 14, in the input image. The object relation analysis unit 15 realizes traffic signs by combining the main signs and the auxiliary signs that have been determined to highly relate to each other as a result.

The orientation determination unit 16 determines orientations of the main signs and the auxiliary signs detected by the object detection unit 14 and determines whether or not the signs are traffic signs related to a traveling direction of the vehicle.

The reliability determination unit 17 obtains and accumulates positions of the main signs and the auxiliary signs detected by the object detection unit 14 and determines reliability of these traffic signs based on a result of the accumulation.

The depiction unit 18 depicts detection frames that surround these objects, namely the main signs and the auxiliary signs detected by the object detection unit 14, on the input image. Since the image on which the detection frames have been depicted by the depiction unit 18 is an image indicating a result of detecting the main signs and the auxiliary signs by the object detection unit 14, the image will be referred to as a post-detection image in the following description.

The recording unit 19 causes the image storage unit 90 to store and save the post-detection image created by the depiction unit 18. The post-detection image is also output from the image processing device 1 to the outside.

The control unit 91 is connected to the aforementioned respective components in the image processing device 1 and control operations thereof. The respective components may independently operate as needed without control performed by the control unit 91.

<Hardware Configuration of Image Processing Device>

FIG. 2 is a diagram illustrating a hardware configuration of the image processing device 1 according to the first embodiment of the invention. As illustrated in FIG. 2, the image processing device 1 includes a CPU 201, a memory 202, a storage device 203, an output device 204, an input device 205, and a communication device 206, and these components are connected to each other via a bus 207.

The CPU 201 is a processor that reads various programs from the memory 202 as needed and executes processing in accordance with the programs. The processing executed by the CPU 201 realizes the respective functional configurations of the input unit 10, the color space conversion unit 11, the contrasting correction unit 12, the color analysis unit 13, the object detection unit 14, the object relation analysis unit 15, the orientation determination unit 16, the reliability determination unit 17, the depiction unit 18, the recording unit 19, and the control unit 91 as illustrated in FIG. 1.

The memory 202 stores various programs to be read by the CPU 201 and temporarily stores various kinds of data to be used in processing being executed by the CPU 201 as needed.

The storage device 203 is a device that stores various kinds of data to be used by the image processing device 1 and corresponds to the image storage unit 90 illustrated in FIG. 1. The storage device 203 stores the aforementioned input images, the contrasting corrected image, the color corrected image, the reference images, and the post-detection image, for example. In addition, the past input images are also stored in the storage device 203.

The output device 204 is a device for outputting the post-detection image and is configured of a device such as a display, a printer, or a speaker. In a case of using a display as the output device 204, for example, the post-detection image generated by the depiction unit 18 is displayed on a screen of the display.

The input device 205 is a device for inputting an instruction or the like from a user and is configured of a device such as a keyboard, a mouse, or a microphone. For example, an input image as a target of processing is determined in the image processing device 1 in response to an instruction from the user via the input device 205.

The communication device 206 is a device for performing communication with other devices. For example, the communication device 206 can be used to receive an input image transmitted from the vehicle camera and to exchange various kinds of data with a server device connected thereto via a network. Instead of providing the communication device 206 inside the image processing device 1, an externally provided communication device 206 may be connected to and used with the image processing device 1.

<Configuration and Operations of Each Part>

Next, the respective functional configurations of the aforementioned color space conversion unit 11, the contrasting correction unit 12, the color analysis unit 13, the object detection unit 14, the object relation analysis unit 15, the orientation determination unit 16, the reliability determination unit 17, the depiction unit 18, and the recording unit 19 will be described below in detail.

(i) Color Space Conversion Unit 11

The color space conversion unit 11 generates an image by converting an RGB color space of an input image into a Lab color space, for example, as color brightness information of the input image. An L value, an a value, and a b value for the input image are obtained by the conversion into the Lab color space. The L value is information corresponding to luminosity, and the a value and the b value are information indicating color brightness.

FIG. 3 is an explanatory diagram of an example of operations of the color space conversion unit 11. In FIG. 3, the image N on the left side represents an example of an input image expressed by an RGB color space, and the image NA on the right side represents an example of an input image after the color space conversion, which is expressed by an Lab color space. These images include a main sign 31, an auxiliary sign 32, and a road 33. The image NA after the color space conversion, which has been obtained by the color space conversion unit 11, is stored in the image storage unit 90.

(ii) Contrasting Correction Unit 12

The contrasting correction unit 12 creates a contrasting corrected image as follows by using the color brightness information of the input image after the color space conversion, which has been obtained by the color space conversion unit 11, that is, at least one of the a value and the b value.

FIG. 4 is an explanatory diagram of an example of operations of the contrasting correction unit 12. In FIG. 4, the image (N−1)A on the left side represents an example of an image obtained by converting a color space of an input image (N−1) obtained in the past, and the image NA on the right upper side represents an example of an image obtained by converting a color space of a current input image N in the same manner as in FIG. 3. The image NB on the right lower side represents an example of an image after contrasting correction.

The contrasting correction unit 12 sets a target region R2 for contrasting correction in a predetermined range of the image NA and calculates an average value aveR2 of color information (the a value or the b value) in the region R2 of the image NA. The average value aveR2 corresponds to an average value of color brightness in the region R2 of the input image N. The position and the shape of the region R2 can be set in advance as a range, in which traffic signs are to be present, in the image NA based on an installation position, an imaging direction, an angle of view, and the like of the vehicle camera.

The contrasting correction unit 12 sets a target region R1 for contrasting correction corresponding to the aforementioned region R2 in the image (N−1)A and calculates an average value aveR1 of color information (the a value or the b value) in the region R1 of the image (N−1)A. The average value aveR1 corresponds to an average value of color brightness in the region R2 in the past input image (N−1). The position and the shape of the region R1 may be the same as those of the region R2 or may be determined in consideration of a vehicle moving distance until the current input image N is obtained after the past input image (N−1) is obtained.

The contrasting correction unit 12 calculates the aforementioned average values aveR2 and aveR1 and then calculates a magnification value v for creating a contrasting corrected image by using the following Equation (1).

$$V = E2/E1 \quad (1)$$

In Equation (2), E1 and E2 each represents any of the average values aveR2 and aveR1. Specifically, E1=aveR2 and E2=aveR1 in a case where aveR1≥aveR2. In contrast, E1=aveR1 and E2=aveR2 in a case where aveR1<aveR2. Alternatively, the magnification value v may be a fixed value.

The contrasting correction unit 12 calculates the magnification value v and then obtains a color brightness value cnCor after the contrasting correction for each pixel in the region R2 of the image NA by using the following Equation (2). In Equation (2), cn represents the a value or the b value of each pixel in the region R2 of the image NA.

$$cnCor = cn - (aveR2 - cn)*v \quad (2)$$

By calculating the color brightness value cnCor after the correction for each pixel in the region R2 of the image NA by the aforementioned Equation (2), it is possible to correct the contrasting of the image NA such that pixels that are darker than the average appear more darkly and pixels that are brighter than the average appear more brightly. Such correction makes it possible to easy detect the main sign 31 as the detection target in later processing even in a case where the main sign 31 is buried in the background and is not easily recognized in the original image NA.

The contrasting correction unit 12 corrects the contrasting of the image NA by obtaining the cnCor value for each pixel in the region R2 of the image NA through the processing as described above and creates the contrasting corrected image NB.

(iii) Color Analysis Unit 13

The color analysis unit 13 calculates color difference values of an input image as follows and creates a color corrected image by using the color difference values.

FIG. 5 is an explanatory diagram of an example of operations of the color analysis unit 13. In FIG. 5, the image N on the left side represents an example of an input image expressed by an RGB color space in the same manner as in FIG. 3, and the image MB on the right side represents an example of the image after color correction.

The color analysis unit 13 sets the target region R2 for color correction in a predetermined range of the input image N in the same manner as the aforementioned contrasting correction unit 12 having performed on the image NA, and calculates color difference values for each pixel in the region R2. Specifically, absolute values s_R, s_G, and s_B of color differences of the respective primary colors of each pixel by using the following Equation (3) from color information values R, G, and B for the respective primary colors of each pixel. In Equation (3), abs represents an absolute value.

$$s\_R = abs(R-G), \ s\_G = abs(G-B), \ s\_B = abs(B-R) \quad (3)$$

In a case where all the absolute values s_R, s_G, and s_B of the color differences obtained by the aforementioned Equation (3) are equal to or less than a predetermined threshold value Th_s, the color analysis unit 13 sets the original color information values R, G, and B without any change for the corresponding pixel. In contrast, any one of the obtained absolute values s_R, s_G, and s_B of the color differences exceeds the threshold value Th_s, the color analysis unit 13 sets all the color information values of the corresponding pixel to 0, and R=G=B=0 is set. The value of the threshold Th_s is Th_S=30, for example.

The color analysis unit 13 corrects the colors of the input image N by resetting the color information values for each pixel in the region R2 of the input image N by the aforementioned processing, and creates a color corrected image MB by masking the colors in the region R2 of the input image N.

(iv) Object Detection Unit 14

The object detection unit 14 creates an image for detecting main sign included in the input image as follows based on the contrasting corrected image created by the contrasting correction unit 12.

FIG. 6 is an explanatory diagram of an example of operations of the object detection unit 14. In FIG. 6, the image NB on the left side represents an example of an image after contrasting correction in the same manner as in FIG. 4, and the image ND on the right side represents an example of an image in which a main sign is separated from a background.

The object detection unit 14 calculates a weighted average value aveRN by weighting the aforementioned average values aveR1 and aveR2 of color brightness in the images (N−1) and N, which have been calculated by the contrasting correction unit 12, by using the following Equation (4). In Equation (4), C2/C1 represents a weighting coefficient for the past input image (N−1), and C3/C1 represents a weighting coefficient for the current input image N. Also, C1=C2+C3.

$$aveRN = aveR1*C2/C1 + aveR2*C3/C1 \quad (4)$$

In a case where it is desired to cause the weighted average value aveRN to approach the color brightness in the past input image (N−1) in the aforementioned Equation (4), it is only necessary to set C2 to be greater than C3 and to set a large weight for the past input image (N−1). In contrast, in a case where it is desired to cause the weighted average value aveRN to approach the color brightness in the current input image N, it is only necessary to set C3 to be greater than C2 and to set a large weight for the current input image N. However, since there is also a case where the main signs cannot be accurately detected in later processing if C3 is set to be large and excessive emphasis is placed on the current input image N, it is necessary to also take the past input image (N−1) into consideration to some extent by not setting the weight C2 to be excessively small. In a case of setting a large weight for the past input image (N−1), for example, setting is made such that C2=0.9 and C3=0.1. In a case of setting a large weight for the current input image N, the setting is considered to be made such that C2=C3=0.5.

The object detection unit 14 calculates the weighted average value aveRN as described above and then obtains a threshold value Th for each image for separating a main sign as a detection target from the background in the contrasting corrected image NB by using the following Equation (5).

$$Th = aveRN + \alpha \quad (5)$$

α in the aforementioned Equation (5) is a correction value for setting the threshold value Th from the weighted average value aveRN. It is possible to extract, from the contrasting corrected image NB, only pixels with brightness that is equal to or higher than desired brightness or only pixels with brightness that is equal to or lower than desired brightness by appropriately setting the correction value α. That is, α in Equation (5) is a parameter for easily cutting the main sign as the detection target object from the contrasting corrected image NB.

In a case where the a value of each pixel in the region R2 of the image NA is assumed to be cn in the aforementioned Equation (2), the color brightness value cnCor of each pixel in the contrasting corrected image NB is set in accordance with the a value of each pixel in the image NA. In such a case, the object detection unit 14 obtains a threshold value Th for each image by setting α as a positive value in Equation (5), and uses the threshold value Th to create the image ND by separating the background and the main sign 31 from the region R2 of the contrasting corrected image NB. Specifically, the color brightness after the separation is set to an s value (s=255, for example) in a case where cnCor≥Th, and the color brightness after the separation is set to a t value (t=0, for example) in a case where cnCor<Th for each pixel in the region R2 of the contrasting corrected image NB. In doing so, it is possible to efficiently separate an object with color brightness that is equal to or greater than a predetermined value in the region R2 as the main sign 31.

In contrast, the b value of each pixel in the region R2 of the image NA is assumed to be cn in the aforementioned Equation (2), the color brightness value cnCor of each pixel in the contrasting corrected image NB is set in accordance with the b value of each pixel in the image NA. In such a case, the object detection unit 14 obtains the threshold value Th for each image by setting α as a negative value in Equation (5) and uses the threshold value Th to create the image ND by separating the background and the main sign 31 from the region R2 of the contrasting corrected image NB. Specifically, the color brightness after the separation is set to the s value (s=255, for example) in a case where cnCor≤Th, and the color brightness after the separation is set to the t value (t=0, for example) in a case where cnCor>Th for each pixel in the region R2 of the contrasting corrected image NB. In doing so, it is possible to efficiently separate the object with the color brightness that is equal to or less than a predetermined value in the region R2 as the main sign 31.

The object detection unit 14 creates the separated image ND in which the main sign 31 as the detection target object has been separated from the contrasting corrected image NB by comparing the cnCor value and the threshold value Th for each pixel in the region R2 of the contrasting corrected image NB by the aforementioned processing and setting the color brightness after the separation based on a result of the comparison. The separated image ND includes a large number of candidates of the main sign 31.

In addition, the object detection unit 14 creates an image for detecting an auxiliary sign included in the input image based on the color corrected image created by the color analysis unit 13 as follows.

FIG. 7 is an explanatory diagram of an example of operations of the object detection unit 14. In FIG. 7, the image MB on the left side represents an example of an image after color correction in the same manner as in FIG. 5, and the image MC on the right side represents an example of an image in which an auxiliary sign is separated from a background.

The object detection unit 14 creates the separated image MC in which the auxiliary sign 32 as a detection target object and the background from the color corrected image MB by extracting a rectangular portion corresponding to the shape of the auxiliary sign in the region R2 of the color corrected image MB. The separated image MC includes a large number of candidates of the auxiliary sign 32.

The object detection unit 14 creates the separated image ND corresponding to the main sign 31 and the separated image MC corresponding to the auxiliary sign 32 as described above, and then executes processing of identifying which of the main sign 31 and the auxiliary sign 32 each of the detection target objects separated from the background in these images corresponds to. In the processing, the object detection unit 14 determines which of the main sign 31 and the auxiliary sign 32 the detection target object is by reading preset reference images corresponding to signs to be identified from the image storage unit 90 and respectively comparing the reference image and the separated images ND and MC. Specifically, the object detection unit 14 creates a histogram A of each reference image and a histogram B of the separated image ND (or MC) by using RGB values in each reference image and the separated image ND (or MC) and calculates similarity between the histograms A and B based on the shapes of these histograms or a Bhattacharyya distance. The object detection unit 14 determines whether or not the main sign 31 (or the auxiliary sign 32) is included in the separated image ND (or MC).

The similarity between the histograms A and B can be calculated by using the following Equation (6), for example. In Equation (6), B32(c) represents the Bhattacharyya distance between the histograms A and B. It is possible to calculate similarity R by using B32(r) related to an r components, B32(g) related to a g components, and B32(b) related to a b component of B32(c). Here, c represents either r, g, orb. Also, HA(I) and HB(I) represent degrees of gradation values I of the histograms A and B, and HSUM represents a total number of histogram bins.

$$B32(c) = \sqrt{1 - \frac{1}{HSUM} \sum_{I=0}^{31} \sqrt{HA(I) \times HB(I)}} \quad (6)$$

$$R = \sqrt{B32(r)^2 + B32(g)^2 + B32(b)^2}$$

Through the processings described above, the object detection unit 14 calculates the similarity between the histograms and determines degrees of similarity between the reference images and the main sign 31 and the auxiliary sign 32 that are the detection target objects. In doing so, it is possible to detect the main sign 31 and the auxiliary sign 32 from the separated images ND and MC, respectively, by using the preset reference images. Furthermore, an identifier may be created from feature amounts of the images for the similarity determination between the histograms by using mechanical learning using a known neural network, and determination of identifying the detected objects by using the identifier may be added. That is, in a case where a plurality of reference images that are determined to have high similarity are detected, the identifier using the neural network is used to identify which of the images is correct (or is likely to be correct) as the detection object.

(v) Object Relation Analysis Unit 15

The object relation analysis unit 15 analyzes a relation between the main sign and the auxiliary sign detected from the separated images ND and MC, respectively, by the object detection unit 14 as follows.

FIG. 8 is an explanatory diagram of an example of operations of the object relation analysis unit 15. In FIG. 8, the image ND on the left side represents an example of an image in which the main sign is separated from the background in the same manner as in FIG. 6, and the image MC on the right side represents an example of an image in which the auxiliary sign and the background are separated in the same manner as in FIG. 7.

In a case of associating the main sign and the auxiliary sign based on the separated image ND, the object relation analysis unit 15 sets a region R3 at a position immediately below the main sign 31 in the region R2 in the separated image ND first as illustrated in FIG. 8 and the region R3 is set at the same position in the separated image MC. Then, it is determined whether or not the auxiliary sign 32 is present in the region R3 of the separated image MC, and if present, the main sign 31 in the separated image ND and the auxiliary region 32 in the separated image MC are associated with each other.

FIG. 9 is an explanatory diagram of an example of operations of the object relation analysis unit 15. In FIG. 8, the image MC on the left side represents an example of an image in which the auxiliary sign and the background are separated in the same manner as in FIG. 7, and the image ND on the right side represents an example of an image in which the main sign and the background are separated in the same manner in FIG. 6.

In a case of associating the main sign and the auxiliary sign based on the separated image MC, the object relation analysis unit 15 sets a region R4 at a position immediately above the auxiliary sign 32 in the region R2 in the separated image MC first as illustrated in FIG. 9 and sets the region R4 at the same position in the separated image ND. Then, it is determined whether or not the main sign 31 is present in the region R4 of the separated image ND, and if present, the main sign 31 in the separated image ND and the auxiliary region 32 in the separated image MC are associated with each other.

The object relation analysis unit 15 sets the regions R3 and R4 for determining the relation between the main sign 31 and the auxiliary sign 32 in the predetermined range below the main sign 31 or the predetermined range above the auxiliary sign 32 by the processing as described above. Then, in the case where the auxiliary sign 32 is present in the region R3 in the separated image MC or in the case where the main sign 31 is present in the region R4 in the separated image ND, the main sign 31 and the auxiliary sign 32 are associated with each other. A flag fin object detection information indicating a result of the detection is set to 1 for each of the main sign 31 and the auxiliary sign 32 associated as described above. In contrast, the flag fin the object detection information is set to 0 for each of objects that are not associated.

There is also a case where a plurality of auxiliary signs 32 immediately below the main sign 31. Even in such a case, it is possible to analyze relations between these objects by the same processing as that described above. However, the flag f of the object detection information of each object is set to 2 in order to associate these objects with each other. It is preferable to set a unique value for the flag of the object detection information of each object in order that the combination of the objects can be recognized.

(vi) Orientation Determination Unit 16

The orientation determination unit 16 determines object orientations of the main sign and the auxiliary sign detected by the object detection unit 14. FIG. 10 is an explanatory diagram of an example of operations of the orientation determination unit 16.

The orientation determination unit 16 obtains a width w and a height h of each of detected objects b1, b2, b3, and b4 in an input image as illustrated in FIG. 10. Each of the objects b1, b2, b3, and b4 in FIG. 10 corresponds to either a main sign or an auxiliary sign detected by the object detection unit 14. Next, a ratio between the width w and the height h of each object is calculated by using the following Equation (7).

$$\text{ratio} = w/h \quad (7)$$

In a case where the calculated ratio is equal to or greater than a predetermined threshold value Th_m (Th_m=0.7, for example), the orientation determination unit 16 determines that the orientation of the object is an orientation related to a traveling direction of the vehicle and sets an orientation flag fm in the object detection information to 1. In contrast, in a case where the ratio is less than the threshold value Th_m, the orientation determination unit determines that the orientation of the object is an orientation that is not related to the traveling direction of the vehicle and sets the orientation flag fm in the object detection information to 0. As a result, the flag fm for the objects b1 and b2 is set to 1, and the flag fm for the objects b3 and b4 is set to 0 in the example of FIG. 10, for example.

The orientation determination unit 16 can respectively determine the orientations of the main sign and the auxiliary sign based on the ratios between the widths and the heights of the main sign and the auxiliary sign, which have been detected in the input image, in the input image by the processing as described above. The aforementioned threshold value Th_m is preferably set to different values for the case where the detected object is a main sign and for the case where the detected object is an auxiliary sign. It is also possible to determine an orientation of a detected object without using the ratio. For example, a rectangle surrounding the detected object may be obtained in an input image, the orientation of the object may be determined based on inclination of each straight line of the rectangle, and the flag fm may be set.

(vii) Reliability Determination Unit 17

The reliability determination unit 17 determines reliability of a result of detecting objects, namely the main sign and the auxiliary sign detected by the object detection unit 14. FIG. 11 is an explanatory diagram of an example of operations of the reliability determination unit 17.

The reliability determination unit 17 obtains a position (latitude and longitude) of each object based on vehicle position information when each detected object is imaged, a vehicle camera installation position, an imaging direction, an angle of view, and the like. Then, the reliability determination unit 17 accumulates a detection frequency of the obtained position for each object as illustrated in FIG. 11 and stores the detection frequency in the storage device 203. At this time, a result of detection by the image processing device 1 owned by another user may be obtained and added to the result of the accumulation. As a result, results of the detections performed a plurality of times are accumulated for each object, namely for each traffic sign.

If the result of the accumulation of the position acquired for each traffic sign is obtained as described above, the reliability determination unit 17 compares the accumulated detection frequency with a preset threshold value Th_h. If the detection frequency is equal to or greater than the threshold value Th_h as a result, it is determined that reliability C of the position (latitude and longitude) of the position of the detected traffic sign is high. It is possible to accurately obtain the position of the traffic sign by determining the reliability of the position of the detected traffic sign as described above even in a case where images captured by vehicle cameras in various vehicles are used. That is, it is possible to recognize the correct position even in a case where moving speeds and imaging positions are different for each moving objects with the vehicle camera installed thereon and thus the positions of the detected traffic sign slightly differ from each other.

(vi) Depiction Unit 18

The depiction unit 18 depicts a result of detecting the main sign and the auxiliary sign by the object detection unit 14 on the input image based on the result of reliability determination by the reliability determination unit 17. FIG. 12 is an explanatory diagram of an example of operations of the depiction unit 18. In FIG. 5, the image N on the left side represents an example of an input image expressed by an RGB color space in the same manner as in FIG. 3, and the image NE on the right side represents an example of an image depicting the result of detecting the main sign and the auxiliary sign.

In a case where the reliability determination unit 17 determines that the reliability C is high, the image NE indicating the result of detecting the objects is created by depicting detection frames 34 and 35 on the input image N so as to respectively surround the main sign 31 and the auxiliary sign 32 detected by the object detection unit 14 as illustrated in FIG. 12. In contrast, in a case where the aforementioned detection frequency does not reach the threshold value Th_h and the reliability determination unit 17 determines that the reliability C is low, the depiction unit 18 does not depict the detection frames 34 and 35 on the input image N and does not create the image NE.

(vii) Recording Unit 19

The recording unit 19 saves, in the image storage unit 90, the image NE created by the depiction unit 18 depicting the detection frames 34 and 35 on the input image N.

<Processing Procedure of Image Processing Device>

FIG. 13 is an explanatory flowchart of operations of the image processing device 1 according to the first embodiment of the invention.

(i) Step S1201

The input unit 10 receives an image input from the vehicle camera and outputs the input image N to the color space conversion unit 11.

(ii) Step S1202

The color space conversion unit 11 obtains an image NA by converting the input image N, which has been output from the input unit 10, into an Lab color space image.

(iii) Step S1203

The contrasting correction unit 12 calculates an average value aveR2 from color brightness in a region R2 from the image NA obtained by the color space conversion unit 11. In addition, the contrasting correction unit 12 reads an image (N−1)A after temporally the second most recent color space conversion from the image storage unit 90 and calculates an average value aveR1 of color brightness in a region R1. Then, the contrasting correction unit 12 generates an image NB with corrected contrasting by using the aforementioned Equations (1) and (2).

(iv) Step S1204

The color analysis unit 13 creates the image MB after color correction with masked colors by obtaining absolute values s_R, s_G, and s_B of color differences for the respective primary colors of each pixel by using the aforementioned Equation (3) and comparing these values with a threshold value Th_s.

(v) Step S1205

The object detection unit 14 obtains a threshold value Th for each image by using the aforementioned Equations (4) and (5).

(vi) Step S1206

The object detection unit 14 compares each pixel value cnCor of the image NB with the corrected contrasting with the threshold value Th. In a case where cnCor corresponds to the a value as a result, and cnCor≥the threshold value Th is satisfied, the processing proceeds to Step S1207. If cnCor<the threshold value Th is satisfied, the processing proceeds to Step S1208. In a case where cnCor corresponds to the b value, the direction of the inequality sign in the determination in Step S1206 is opposite to that in FIG. 13. That is, the processing proceeds to Step S1207 if cnCor≤the threshold value Th, or the processing proceeds to Step S1208 if cnCor>the threshold value Th.

(vii) Step S1207

In both the cases where each pixel value cnCor of the image NB corresponds to the a value and the b value, the object detection unit 14 sets a correction value to the s value (255, for example).

(viii) Step S1208

In both the cases where each pixel value cnCor of the image NB corresponds to the a value and the b value, the object detection unit 14 sets the correction value to the t value (0, for example).

(ix) Step S1209

The object detection unit 14 repeats the aforementioned processing from Step S1206 to Step S1208 until correction values can be obtained for all the pixels in the target image. An image ND with a background and an object separated from the image NB us created, and a main sign 31 as a detection target is detected by repeating the processing from Step S1206 to Step S1209.

(x) Step S1210

The object detection unit 14 obtains an object that forms a rectangle in the region R2 of the image MB. In doing so, an image MC with the background and the object separated from the image MB is created, and the auxiliary sign 32 as a detection target is detected.

(xi) Step S1211

The object detection unit 14 reads a reference image from the image storage unit 90, creates histograms for the image of the detected object and the reference image, respectively, and calculates similarity R between the histograms by using the aforementioned Equation (6). Then, the object detection unit 14 determines a degree of similarity between the detected object and the reference image based on the calculated similarity R, determines that the similarity is high when the similarity R≤a threshold value Th_R, for example, and identifies the detected object as a traffic sign. Since the similarity R is calculated as a Bhattacharyya distance, a smaller value of the similarity R means a shorter distance between the histograms and higher similarity. At this time, an identifier obtained by mechanical learning using a neural network may be used to determine whether or not the sign is a sign to be identified by adding a determination result of the identifier to the above determination.

(xii) Step S1212

The object relation analysis unit 15 sets a detection region above or below the object detected by the object detection unit 14 and analyzes a relation between the objects. That is, in a case where the object is a main sign, the detection region is set immediately below the object, and whether or not an object corresponding to an auxiliary sign is present is analyzed. In a case where the object is an auxiliary sign, the detection region is set immediately above the object, and whether or not a main sign is present is analyzed. In a case where each target object is present, the flag f of each object is set to 1. In a case where no target object is present, the flag f of each object is set to 0. A unique value is set for the flag of each object in order that a combination of the objects can be recognized.

(xiii) Step S1213

The orientation determination unit 16 calculates a ratio for each of the detected objects by using Equation (7) and determined the orientation of each object. That is, in a case where the ratio is equal to or greater than a threshold value Th_m, it is determined that the orientation of each detected object is an orientation related to the traveling direction of the vehicle, and the orientation flag fm is set to 1. In contrast, in a case where the ratio is less than the threshold value Th_m, it is determined that the orientation of each detected object is an orientation that is not related to the traveling direction of the vehicle, and the orientation flag fm is set to 0.

(xiv) Step S1214

The reliability determination unit 17 accumulates position information (latitude and longitude) of each detected object at the time of capturing the image, and if the accumulated detection frequency is equal to or greater than a threshold value Th_h, it is determined that reliability C of the position of each detected object is high. In contrast, if the detection frequency is less than the threshold value Th_h, it is determined that the reliability C is low. The reliability determination unit 17 performs such determination of reliability C for each object detected by the object detection unit 14.

(xv) Step S1215

The depiction unit 18 depicts detection frames 34 and 35 on the input image N so as to surround the objects detected by the object detection unit 14 to create the image NE in a case where the reliability C is high. In a case where the reliability C is low in contrast, the depiction unit 18 does not depict the detection frames on the input image N.

(XVI) Step S1216

The recording unit 19 saves the image NE, on which the detection frames 34 and 35 have been depicted by the depiction unit 18, in the image storage unit 90.

According to the first embodiment of the invention, the image NB with the contrasting corrected from the input image N is created by using the average value aveR1 of the color brightness based on the past input image (N−1) and the average value aveR2 of the color brightness based on the current input image N, and the image ND is created by obtaining the threshold value Th for separating the main sign and the background for each image NB as described above. Therefore, it is possible to separate the back ground and the main sign as a detection target in the input image N by using the threshold value Th.

Also, the image MC is created by calculating the average values s_R, s_G, and s_B of the color differences of the respective primary colors of each pixel in the input image N for R, G, and B as primary colors of the colors, creating the image MB with the masked colors, and obtains a rectangle in the image MB. Therefore, it is possible to separate the background and the auxiliary sign as a detection target in the input image N.

Also, a relation is analyzed by setting a region above or below the detected object and analyzing the presence of an object in the region. Therefore, it is possible to determine the relation between the objects.

In addition, an orientation is obtained from a ratio between the width and the height of each detected object. Therefore, it is possible to determine whether or not the orientation of each detected object is an orientation related to the traveling direction of the vehicle.

It is possible to more accurately obtain position information of each detected object by accumulating position information of the detected object and determining the detection frequency.

Since the objects are detected in the image MB with the masked colors and the image NB with the emphasized contrasting, and the objects are detected in accordance with the color and the contrasting of the image appearing in the image even if a part of the main sign or the auxiliary sign is not within the image, it is possible to detect the main sign and the auxiliary sign.

It is possible to separate the background in the image and the object in the background and to detect the object in the background even if the brightness of images in a moving image varies depending on the traveling direction of the moving vehicle, by creating an image with contrasting emphasized from the target image by using brightness information of the past image and the target image and obtaining the threshold value for separating the region in the image for each image. It is possible to detect the objects in the image and to determine the relation between the detected objects and orientations of the objects as well as more accurate position information. Furthermore, it is possible to timely detect the road attached objects on a newly constructed road or a road changed by construction, by detecting objects in moving images from vehicle smart phones captured by an infinite large number of users and obtaining more accurate positions from detection frequencies of position information.

According to the first embodiment of the invention as described above, the following effects and advantages are achieved.

(1) The image processing device 1 includes the contrasting correction unit 12, the color analysis unit 13, the object detection unit 14, and the object relation analysis unit 15. The contrasting correction unit 11 creates the contrasting corrected image NB by correcting contrasting of the input image N captured by the vehicle camera installed on the vehicle. The color analysis unit 13 creates the color corrected image MB by correcting colors of the input image N. The object detection unit 14 detects the main sign 31 included in the input image N based on the contrasting corrected image NB and detects the auxiliary sign 32 included in the input image N based on the color corrected image MB. The object relation analysis unit 15 recognizes traffic signs as a combination of the main sign 31 and the auxiliary sign 32 by associating the main sign 31 and the auxiliary sign 32 with each other based on the positional relationship between the main sign 31 and the auxiliary sign 32, which have been detected by the object detection unit 14, in the input image N. In this manner, it is possible to accurately recognize the traffic signs as the combination of the main sign and the auxiliary sign.

(2) The image processing device 1 further includes the orientation determination unit 16. The orientation determination unit 16 respectively determines the orientations of the main sign 31 and the auxiliary sign 32 based on the ratios ratio between the widths w and the heights h of the detected main sign 31 and the auxiliary sign 32 in the input image N. In this manner, it is possible to determine whether or not the recognized traffic signs indicate road regulations or the like in relation to the traveling direction of the vehicle.

(3) The image processing device 1 further includes the reliability determination unit 17. The reliability determination unit 17 obtains positions of traffic signs and determines reliability C of the traffic signs based on a result of accumulating the obtained positions of the traffic signs. In this manner, it is possible to determine whether or not the detection results of the traffic signs are correct.

(4) The contrasting correction unit 12 sets the target region R2 within a predetermined range of the input image N and creates the contrasting corrected image NB based on the average value aveR1 of color brightness in the region R1 corresponding to the target region R2 in the past image (N−1) captured before the input image N and the average value aveR2 of color brightness in the target region R2 in the input image N. In this manner, it is possible to create the contrasting corrected image NB that is appropriate for detecting the main sign 31.

(5) The color analysis unit 13 sets the target region R2 within a predetermined range of the input image N and creates the color corrected image MB based on the color difference values s_R, s_G, and s_B in the target region R2 of the input image N. In this manner, it is possible to create the color corrected image MB that is appropriate for detecting the auxiliary sign 32.

(6) The object detection unit 14 respectively detects the main sign 31 and the auxiliary sign 32 by using preset reference images. In this manner, it is possible to accurately detect the main sign 31 and the auxiliary sign 32, respectively.

(7) The object relation analysis unit 15 associates the main sign 31 and the auxiliary sign 32 with each other in a case where the auxiliary sign 32 is present within the region R3 set within a predetermined range below the main sign 31 or in a case where the main sign 31 is present within the region R4 set within a predetermined range above the auxiliary sign 32. In this manner, it is possible to accurately and reliably associate the main sign 31 and the auxiliary sign 32 that form the same traffic sign.

Second Embodiment

FIG. 14 is a block diagram illustrating a configuration of an alarming apparatus 1300 according to a second embodiment of the invention. The alarming apparatus 1300 is used while being installed on a vehicle, and functions as a navigation system that displays a route on a map and navigates a user to a destination, for example. Furthermore, the alarming apparatus 1300 corrects information about targets such as traffic signs that are present around the vehicle in real time and outputs alarm (alert) by screen display or sound when the vehicle approaches predetermined alarming locations. The alarming locations may be general-purposed buildings such as public offices or police offices, predetermined locations such as landmark buildings, or locations that the user has marked during traveling of the vehicle. The alarming apparatus 1300 according to the embodiment provides useful information to the user while collecting information from the user.

The alarming apparatus 1300 includes an imaging device 1301 that captures image data, the image processing device 1 that recognizes an image including detection targets from the image data, a display device 1302 that displays a post-recognition image output from the image processing device 1, and an output device 1303 that outputs alert information output from the image processing device 1. A device such as a smartphone, for example, can be used as the alarming apparatus 1300. The imaging device 1301 is configured of a CMOS sensor or a CCD camera and corresponds to the vehicle camera described in the first embodiment. The configuration and the operations of the image processing device 1 are as described above in the first embodiment.

The image processing device 1 recognizes various traffic signs formed of main signs and auxiliary signs from an image captured by the imaging device 1301 as described in the first embodiment. Furthermore, reference images corresponding to objects such as attached objects on roads may be prepared and included in recognition targets.

The display device 1302 displays images indicating recognition results such as speed signs and auxiliary signs output from the image processing device 1 and corresponds to a display device of a smartphone, for example.

The output device 1303 outputs alarm through images or sound based on alert information output from the image processing device 1 and corresponds to a display device or a speaker of a smartphone, for example.

The alarming apparatus 1300 outputs alert information from the image processing device 1 to the output device 1303 based on the aforementioned result of recognizing objects such as traffic signs by the object relation analysis unit 15 in the image processing device 1. The output device 1303 outputs alarm to the user who is a driver of the vehicle in response to an output of the alert information from the image processing device 1. In a case where content of the detected objects coincide with map information, for example, the output device 1303 provides the map information to the user. In a case where the content of the detected objects does not coincide with the map information in detection performed once, the output device 1303 does not provide the alert information to the user at that timing. In a case where objects are not detected a plurality of times at the same point while there is information about an object in the map information, a message to encourage the user to check the sign is provided since there is a possibility that the signs at the location has changed. For example, the message is provided by outputting sound such as "please check a sign". In a case of providing information about traffic signs as a combination of a main sign and an auxiliary sign, the information may be provided to the user in combination, or the information may be separately provided to the user. Furthermore, an image captured at the point where the alert is output, an image indicating the result of recognizing the object, or the like may be registered in the alarming apparatus 1300 along with information indicating the point.

According to the second embodiment of the invention as described above, the alarming apparatus 1300 includes the image processing device 1 and the output device 1303 as the alarm output unit that outputs alarm to the driver of the vehicle based on a result of recognizing traffic signs by the object relation analysis unit 15. In this manner, it is possible to provide the alarming apparatus 1300 that recognizes traffic signs such as speed signs as combination of main signs and auxiliary signs from images captured by a smartphone or the like installed on the vehicle and provides a set of an image recognizing the result of the recognition and alert information to the user.

Third Embodiment

FIG. 15 is a block diagram illustrating a configuration of an image processing system 1400 according to a third embodiment of the invention. The image processing system 1400 creates POI (Point of Interest) information from an image captured from a vehicle and includes a server 1403 and a mobile terminal device 1407.

The mobile terminal device 1407 includes an imaging device 1401 that captures image data, an image processing device 1A that simply detects an image including detection targets in the image data, a communication device 1402 that transmits a post-detection image output from the image processing device 1A to a server 1403 and receives a post-recognition image transferred from the server 1403, and a display device 1405 that displays the post-recognition image. A device such as a smartphone can be used as the mobile terminal device 1407 in the same manner as the alarming apparatus 1300 described in the second embodiment. The imaging device 1401 is formed of a CMOS sensor or a CCD camera and corresponds to the vehicle camera described in the first embodiment.

The image processing device 1A includes functional configurations from the input unit 10 to the object detection unit 14 from among the respective functional configurations of the image processing device 1 described in the first embodiment with reference to FIG. 1. That is, the mobile terminal device 1407 includes, as the image processing device 1A, the input unit 10, the color space conversion unit 11, the contrasting correction unit 12, the color analysis unit 13, and the object detection unit 14. The image processing device 1A causes the object detection unit 14 to detect main signs, auxiliary signs, and the like from an image captured by the imaging device 1401 and outputs an image indicating a result of the detection thereof as the post-detection image to the communication device 1402. Furthermore, the image processing device 1A may include objects such as attached objects on roads and specific signboards indicating facility information, spot information, and the like in the detection targets. The post-detection image may be the entire image captured or may be a partial image including the detected objects. The communication device 1402 transmits the post-detection image for the detected targets, which is output from the image processing device 1A, to the server 1403 and corresponds to the communication device 206 described in the first embodiment with reference to FIG. 2.

The server 1403 includes a communication device 1404 that receives the post-detection image transmitted from the mobile terminal device 1407 and transmits the post-recognition image, which has been output from an image processing device 1B, to the mobile terminal device 1407, the image processing device 1B that recognizes various traffic signs formed of main signs and auxiliary signs in the received post-detection image, and a storage device 1406 that stores the POI information based on the post-recognition image output from the image processing device 1B.

The image processing device 1B has the same functional configuration as that of the image processing device 1 described in the first embodiment with reference to FIG. 1. The image processing device 1B recognizes traffic signs formed of main signs and auxiliary signs, attached objects on roads, and objects such as specific signboards from the post-detection image transmitted from the mobile terminal device 1407 by the configurations from the input unit 10 to the object relation analysis unit 15. The storage device 1406 stores, as the POI information, such post-recognition image in combination with position information.

The communication device 1404 transmits the post-recognition image for these recognized target objects, which has been output from the image processing device 1B, to the mobile terminal device 1407 and corresponds to the communication device 206 described in the first embodiment with reference to FIG. 2.

If the post-recognition image is transmitted from the server 1403, the communication device 1402 of the mobile terminal device 1407 receives the post-recognition image and outputs the post-recognition image to the display device 1405. The display device 1405 displays the post-recognition image transferred from the server 1403 and corresponds to a display device of a smartphone, for example. At this time, the display device 1405 may display a map screen, for example, and provide information related to the recognized traffic signs or the like to the user who is a driver of the vehicle by displaying marks indicating presence of targets included in the post-recognition image at corresponding positions on the map screen.

According to the third embodiment of the invention as described above, the image processing system 1400 includes the mobile terminal device 1407 installed on the vehicle and the server 1403 that performs communication with the mobile terminal device 1407. The mobile terminal device 1407 includes, as the image processing device 1A, the contrasting correction unit 12, the color analysis unit 13, and the object detection unit 14, and also includes the communication device 1402 as an image transmission unit that transmits the post-detection image indicating a result of detecting the main signs and the auxiliary signs by the object detection unit 14 to the server 1403. The server 1403 includes the communication device 1404 as an image receiving unit that receives the post-detection image transmitted from the mobile terminal device 1407, and the image processing device 1B has the same configuration as that of the image processing device 1 that recognizes traffic signs as combinations of main signs and auxiliary signs by using the received post-detection image as described above with reference to FIG. 1. In this manner, it is possible to provide a system that recognizes traffic signs as combinations of main signs and auxiliary signs, specific signboards, and the like from images captured by a smartphone or the like installed on the vehicle and stores a set of the post-recognition image and position information as the POI information.

In the image processing system 1400, the communication device 1404 of the server 1403 also functions as a second image transmission unit that transmits the post-recognition image in relation to traffic signs recognized by the image processing device 1B to the mobile terminal device 1407. Also, the communication device 1402 of the mobile terminal device 1407 also functions as a second image receiving unit that receives the post-recognition image transmitted from the server 1403. Furthermore, the mobile terminal device 1407 includes the display device 1405 as a notification unit that provides information related to traffic signs to the driver of the vehicle based on the post-recognition image received by the communication device 1402. In this manner, it is possible to provide information that is useful during driving of the vehicle to the driver.

Fourth Embodiment

FIG. 16 is a block diagram illustrating a configuration of an image processing system 1500 according to a fourth embodiment of the invention. The image processing system 1500 outputs alarm to the driver of the vehicle based on images captured from the vehicle and includes a server 1503 and a mobile terminal device 1508.

The image processing system 1500 functions as a navigation system that displays a route on a map and navigates a user to a destination, for example, in the same manner as the alarming apparatus 1300 described in the second embodiment. Furthermore, the image processing system 1500 collects information of targets such as traffic signs that are present around the vehicle in real time and outputs alarm (alert) through screen display or sound when the vehicle approaches predetermined alarming locations. The alarming locations may be general-purposed buildings such as public offices or police offices, predetermined locations such as landmark buildings, or locations that the user has marked during traveling of the vehicle. The image processing system 1500 according to the embodiment provides useful information to the user while collecting information from the user.

The mobile terminal device 1508 includes an imaging device 1501 that captures image data, the image processing device 1A that simply detects images including detection targets in the image data, a communication device 1502 that transmits a post-detection image output from the image processing device 1A to a server 1503 and receives a post-recognition image and alert information transferred from the server 1503, a display device 1505 that displays the post-recognition image, and an output device 1506 that outputs the alert information. A device such as a smartphone can be used as the mobile terminal device 1508 in the same manner as the mobile terminal device 1407 described in the third embodiment. The imaging device 1501 is formed of a CMOS sensor, a CCD camera, or the like and corresponds to the vehicle camera described in the first embodiment.

A configuration and operations of the image processing device 1A are as described above in the third embodiment. The communication device 1502 corresponds to the communication device 206 described in the first embodiment with reference to FIG. 2.

The server 1503 includes a communication device 1504 that receives a post-detection image transmitted from the mobile terminal device 1508 and transmits a post-recognition image and alert information, which have been output from the image processing device 1B, to the mobile terminal device 1508, the image processing device 1B that recognizes various traffic signs formed of main signs and auxiliary signs from the received post-detection image, and a storage device 1507 that stores recognition information based on the post-recognition image output from the image processing device 1B.

A configuration and operations of the image processing device 1B are as described above in the third embodiment. The server 1503 outputs the post-recognition image and the alert information from the image processing device 1B to the communication device 1504 based on a result of recognizing objects such as traffic signs by the image processing device 1B. The storage device 1507 stores, as recognition information, a post-recognition image obtained by recognizing attached objects on roads, such as traffic signs, by the image processing device 1B in combination with position information. The communication device 1504 transmits the post-recognition image of the recognized target objects and alert information, which have been output from the image processing device 1B, to the mobile terminal device 1508 and corresponds to the communication device 206 described in the first embodiment with reference to FIG. 2.

If the post-recognition image and the alert information are transmitted from the server 1503, the communication device 1502 of the mobile terminal device 1508 receives the post-recognition image and the alert information and outputs the post-recognition image and the alert information to the display device 1505 and the output device 1506, respectively. The display device 1505 displays and provides the post-recognition image, which has been transferred from the server 1503, to the user in the same manner as the display device 1405 as described above in the third embodiment and corresponds to a display device of a smartphone, for example.

The output device 1506 outputs alarm based on the alert information transferred from the server 1503 through an image or sound and corresponds to a display device or a speaker of a smartphone, for example. In addition, an image captured at a point where the alert is output, an image indicating a result of recognizing an object, and the like may be registered in the server 1503 or the mobile terminal device 1508 in addition to information indicating the point.

According to the fourth embodiment of the invention as described above, the image processing system 1500 includes the mobile terminal device 1508 installed on the vehicle and the server 1503 that performs communication with the mobile terminal device 1508 in the same manner as the image processing system 1400 according to the third embodiment. The mobile terminal device 1508 includes, as the image processing device 1A, the contrasting correction unit 12, the color analysis unit 13, and the object detection unit 14 and also includes the communication device 1502 as an image transmission unit that transmits a post-detection image indicating a result of detecting main signs and auxiliary signs by the object detection unit 14 to the server 1503. The server 1503 includes the communication device 1504 as an image receiving unit that receives the post-detection image transmitted from the mobile terminal device 1508, and the image processing device 1B includes the same configuration as that of the image processing device 1 described with reference to FIG. 1 that uses the received post-detection image to recognize traffic signs as a combination of a main sign and an auxiliary sign. Furthermore, the communication device 1504 of the server 1503 in the image processing system 1500 also functions as an alarm information transmission unit that transmits alarm information (alert information) based on a result of recognizing traffic signs by the image processing device 1B to the mobile terminal device 1508. Also, the communication device 1502 of the mobile terminal device 1508 also functions as an alarm information receiving unit that receives the alarm information (alert information) transmitted from the server 1503. Furthermore, the mobile terminal device 1508 includes the output device 1506 as an alarm output unit that outputs alarm to the driver of the vehicle based on the alarm information (alert information) received by the communication device 1502. In this manner, it is possible to provide a system that recognizes traffic signs as a combination of a main sign and an auxiliary sign in an image captured by a smartphone or the like installed on the vehicle and provides alarm based on the recognition result to the user.

Fifth Embodiment

FIG. 17 is a block diagram illustrating a configuration of an image processing system 1600 according to a fifth embodiment of the invention. The image processing system 1600 presents information about targets such as traffic signs that are present around the vehicle while collecting the information in real time and navigates the vehicle to a destination in accordance with a traveling route if the user sets the traveling route, for example. At this time, the image processing system 1600 navigates the vehicle based on a result of recognizing traffic signs in response to the recognition of the traffic signs related to vehicle navigation on the set route in the embodiment instead of performing vehicle navigation by displaying a route on a map as in the case of the alarming apparatus 1300 described in the second embodiment. If a traffic sign indicating a left-turn direction is recognized at a point where the vehicle is to turn left, for example, the vehicle is navigated by a method of outputting sound like "please turn left at this corner". The image processing system 1600 includes a server 1603 and a mobile terminal device 1608.

The mobile terminal device 1608 includes an imaging device 1601 that captures image data, the image processing device 1A that simply detects an image including detection target from the image data, a communication device 1602 that transmits a post-detection image output from the image processing device 1A to the server 1603 and receives a post-recognition image and navigation information transferred from the server 1603, a display device 1605 that displays the post-recognition image, and an output device 1606 that outputs the navigation information. A device such as a smartphone can be used as the mobile terminal device 1608 in the same manner as the mobile terminal device 1407 described in the third embodiment or the mobile terminal device 1508 described in the fourth embodiment. The imaging device 1601 is formed of a CMOS sensor, a CCD camera, or the like and corresponds to the vehicle camera described in the first embodiment.

The configuration and the operations of the image processing device 1A are as described above in the third embodiment. The communication device 1602 corresponds to the communication device 206 described above in the first embodiment with reference to FIG. 2.

The server 1603 includes a communication device 1604 that receives a post-detection image transmitted from the mobile terminal device 1608 and transmits a post-recognition image and navigation information output from the image processing device 1B to the mobile terminal device 1608, the image processing device 1B that recognizes various traffic signs formed of main signs and auxiliary signs and direction signboards in the received post-detection image, and a storage device 1607 that stores recognition information based on the post-recognition image output from the image processing device 1B.

The configuration and the operations of the image processing device 1B are as described above in the third embodiment. The server 1603 outputs the post-recognition image and the navigation information from the image processing device 1B to the communication device 1604 based on the result of recognizing objects such as traffic signs and direction signboards by the image processing device 1B. For example, the server 1603 identifies whether or not a signboard is a direction signboard related to the traveling direction of the vehicle, identifies a navigation direction by pattern matching of an arrow or characters from the arrow or the characters on the direction signboard, and outputs navigation information. The storage device 1607 stores, as recognition information, the post-recognition image obtained by the image processing device 1B recognizing attached objects on roads such as traffic signs in combination with position information. The communication device 1604 transmits the post-recognition image of recognized target objects and the navigation information output from the image processing device 1B to the mobile terminal device 1608 and corresponds to the communication device 206 described in the first embodiment with reference to FIG. 2.

If the post-recognition image and the navigation information are transmitted from the server 1603, the communication device 1602 of the mobile terminal device 1608 receives the post-recognition image and the navigation information and outputs the post-recognition image and the navigation information to the display device 1605 and the output device 1606, respectively. The display device 1605 displays and provides the post-recognition image transferred from the server 1603 to the user in the same manner as the display device 1405 described in the third embodiment, and corresponds to a display device of a smartphone, for example.

The output device 1606 navigates the vehicle to a destination by providing an instruction about a direction in which the vehicle is to turn, for example, to the user through an image or sound based on the navigation information transferred from the server 1603. The output device 1606 corresponds to a display device or a speaker of a smartphone, for example.

According to the fifth embodiment of the invention as described above, the image processing system 1600 includes the mobile terminal device 1608 installed on the vehicle and the server 1603 that performs communication with the mobile terminal device 1608 in the same manner as the image processing system 1400 according to the third embodiment. The mobile terminal device 1608 includes, as the image processing device 1A, the contrasting correction unit 12, the color analysis unit 13, the object detection unit 14, and further includes the communication device 1602 as an image transmission unit that transmits a post-detection image indicating a result of detecting main signs and auxiliary signs by the object detection unit 14 to the server 1603. The server 1603 includes the communication device 1604 as an image receiving unit that receives the post-detection image transmitted from the mobile terminal device 1608, and the image processing device 1B includes the same configuration as that of the image processing device 1 described with reference to FIG. 1 that uses the received post-detection image to recognize traffic signs as a combination of a main sign and an auxiliary sign. Furthermore, the communication device 1604 of the server 1603 in the image processing system 1600 also functions as a navigation information transmission unit that transmits navigation information for guiding the vehicle to a predetermined destination to the mobile terminal device 1608 based on a result of recognizing the traffic signs by the image processing device 1B. The communication device 1602 of the mobile terminal device 1608 also functions as a navigation information receiving unit that receives the navigation information transmitted from the server 1603. Furthermore, the mobile terminal device 1608 includes an output device 1606 as a vehicle navigation unit that navigates the vehicle to a destination based on the navigation information received by the communication device 1602. In this manner, it is possible to provide a system that recognizes traffic signs as a combination of a main sign and an auxiliary sign in an image captured by a smartphone or the like installed on the vehicle and simply navigates the vehicle based on the recognition result.

The following modifications can be made for the aforementioned respective embodiments.

Although the color space conversion unit 11 creates an image by converting an input image into an Lab color space, the color space conversion unit 11 may convert the input image into an image of another color space such as an HSV color space. The same effects as those in the aforementioned embodiments can be achieved even in the case.

Although the object detection unit 14 determines similarity between reference images and images of detected objects by using Equation (6), the similarity may be determined by using any one of B32(r), B32(g), and B32(b) or a combination thereof. The same effects as those in the aforementioned embodiments can be achieved even in the case.

Although the object relation analysis unit 15 associates a main sign and an auxiliary sign by setting a region at a position immediately below the main sign or a position immediately above the auxiliary sign, the region may be set at another position, such as a position on the left side of the main sign or a position on the right side of the auxiliary sign, and the region for searching for the main sign or the auxiliary sign may be set in accordance with a positional relationship between signs that differs depending on countries. The same effects as those in the aforementioned embodiments can be achieved even in the case.

Although the orientation determination unit 16 determines an orientation of an object by using a ratio between a width and a height of the detected object by using Equation (7), a rectangle including the object may be obtained, and the orientation of the object may be determined based on inclination of the respective straight lines of the rectangle. The same effects as those in the aforementioned embodiments can be achieved even in the case.

The invention can be realized by program codes of software that realize the functions of the embodiments. In such a case, a storage medium that stores the program codes is provided to a system or an apparatus, and a computer (CPU, MPU, or the like) installed on the system or the apparatus reads the program codes stored in the storage medium. In this case, the aforementioned functions of the embodiment are realized by the computer executing the program codes read from the storage medium, and the program codes, the storage medium that stores the program codes, the computer that executes the program codes, and the like are components of the invention. As the storage medium that supplies such program codes, a flexible disk, a CD-ROM, a DVD-ROM, a hard disk, an optical disc, a magnet-optical disc, a CD-R, a magnetic tape, a non-volatile memory card, or a ROM, for example, is used.

The aforementioned embodiments and various modification examples are described only for illustrative purposes, and the invention is not limited to the content as long as features of the invention are not compromised. The invention is not limited to the aforementioned embodiments and modification examples, and various amendments can be made without departing from the gist of the invention.

What is claimed is:

1. An image processing system comprising:
a terminal device that is installed on a vehicle; and
a server device that performs communication with the terminal device,
wherein the terminal device includes
a contrasting correction unit that creates a contrasting corrected image by correcting contrasting an input image captured by a vehicle camera installed on a vehicle,
a color analysis unit that creates a color corrected image by correcting colors in the input image,
an object detection unit that detects a main sign included in the input image based on the contrasting corrected image and detects an auxiliary sign included in the input image based on the color corrected image, and
an image transmission unit that transmits a post-detection image indicating a result of detecting the main sign and the auxiliary sign by the object detection unit to the server device, and
wherein the server device includes
an image receiving unit that receives the post-detection image transmitted from the terminal device,
a second contrasting correction unit that creates a contrasting corrected image by correcting contrasting of the post-detection image received by the image receiving unit,
a second color analysis unit that creates a color corrected image by correcting colors of the post-detection image received by the image receiving unit,
a second object detection unit that detects a main sign included in the post-detection image based on the contrasting corrected image and detects an auxiliary sign included in the post-detection image based on the color corrected image, and
an object relation analysis unit that recognizes a traffic sign as a combination of the main sign and the auxiliary sign by associating the main sign and the auxiliary sign with each other based on a positional relationship between the main sign and the auxiliary sign in the post-detection image received by the image receiving unit.

2. The image processing system according to claim 1, wherein the server device further includes a second image transmission unit that transmits a post-recognition image related to the traffic sign recognized by the object relation analysis unit to the terminal device, and
wherein the terminal device further includes
a second image receiving unit that receives the post-recognition image transmitted from the server device, and
a notification unit that provides information related to the traffic sign to a driver of the vehicle based on the post-recognition image received by the second image receiving unit.

3. The image processing system according to claim 1, wherein the server device further includes an alarm information transmission unit that transmits alarm information based on a result of recognizing the traffic sign by the object relation analysis unit to the terminal device, and wherein the terminal device further includes
- an alarm information receiving unit that receives the alarm information transmitted from the server device, and
- an alarm output unit that outputs an alarm to the driver of the vehicle based on the alarm information received by the alarm information receiving unit.

4. The image processing system according to claim 1, wherein the server device further includes a navigation information transmission unit that transmits navigation information for navigating the vehicle to a predetermined destination to the terminal device based on a result of recognizing the traffic sign by the object relation analysis unit, and wherein the terminal device further includes
- a navigation information receiving unit that receives the navigation information transmitted from the server device, and
- a vehicle navigation unit that navigates the vehicle to the destination based on the navigation information received by the navigation information receiving unit.

* * * * *